United States Patent [19]
Hayashi

[11] Patent Number: 5,657,139
[45] Date of Patent: Aug. 12, 1997

[54] ARRAY SUBSTRATE FOR A FLAT-DISPLAY DEVICE INCLUDING SURGE PROTECTION CIRCUITS AND SHORT CIRCUIT LINE OR LINES

[75] Inventor: Hisaaki Hayashi, Hyogo-ken, Japan

[73] Assignee: Kabushiki Kaisha Toshiba, Kawasaki, Japan

[21] Appl. No.: 536,130

[22] Filed: Sep. 29, 1995

[30] Foreign Application Priority Data

Sep. 30, 1994 [JP] Japan .................. 6-236259

[51] Int. Cl.$^6$ .................. H01L 23/62; H01L 29/00
[52] U.S. Cl. .................. 349/40; 361/111; 257/356; 257/546
[58] Field of Search .................. 257/328, 356, 257/546; 359/59, 87, 88, 58; 361/56, 111

[56] References Cited

U.S. PATENT DOCUMENTS

| | | | |
|---|---|---|---|
| 5,068,748 | 11/1991 | Ukai et al. | 359/59 |
| 5,200,876 | 4/1993 | Takeda et al. | 359/59 |
| 5,212,573 | 5/1993 | Yamazaki | 257/356 |
| 5,220,443 | 6/1993 | Noguchi | 359/59 |
| 5,233,448 | 8/1993 | Wu | 359/59 |
| 5,313,319 | 5/1994 | Salisbury | 359/59 |
| 5,323,254 | 6/1994 | Pitt | 359/88 |
| 5,373,377 | 12/1994 | Ogawa et al. | 359/87 |
| 5,471,329 | 11/1995 | Nakajima et al. | 359/59 |

FOREIGN PATENT DOCUMENTS

| | | | |
|---|---|---|---|
| 3-296725 | 12/1991 | Japan . | |
| 5-142568 | 6/1993 | Japan | 359/59 |

*Primary Examiner*—William L. Sikes
*Assistant Examiner*—Ron Trice
*Attorney, Agent, or Firm*—Cushman, Darby & Cushman

[57] ABSTRACT

An array substrate for a flat-panel display device includes a glass substrate, a display section formed on the glass substrate and having pixel electrodes arrayed in row and column directions, pixel TFTs connected to the pixel electrodes for controlling the potentials thereof, and wiring lines including scan lines and signal lines which are connected to the pixel TFTs and extending to a removable area outside the display section, a short-circuit line formed in the removable area, surge-protection switch circuits formed in the removable area and connected between the short-circuit line and the wiring lines, each for electrically connecting a corresponding one of the wiring lines to the short-circuit line when the potential of the corresponding wiring line exceeds a predetermined level, and test pads formed in the removable area and connected to the wiring lines. Particularly, the test pads and the surge-protection switch circuits are located on one side of the display section in each of the row and column directions, and adjacent ones of the test pads are set apart from a periphery of the glass substrate by different distances.

14 Claims, 4 Drawing Sheets

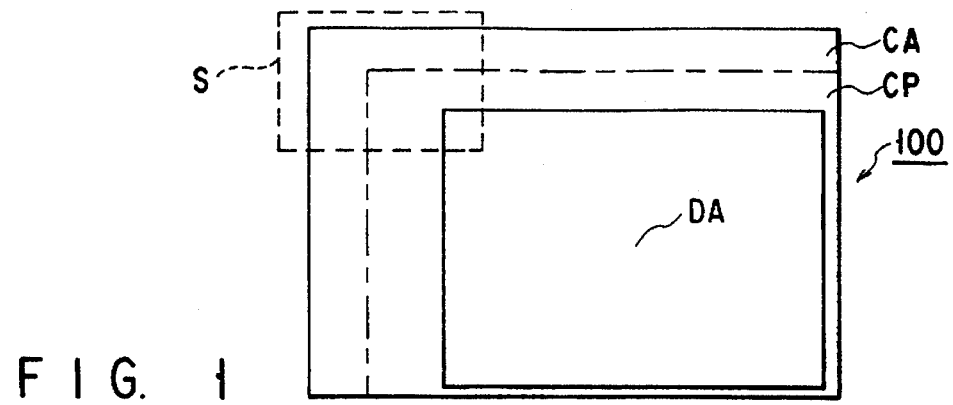
F I G. 1
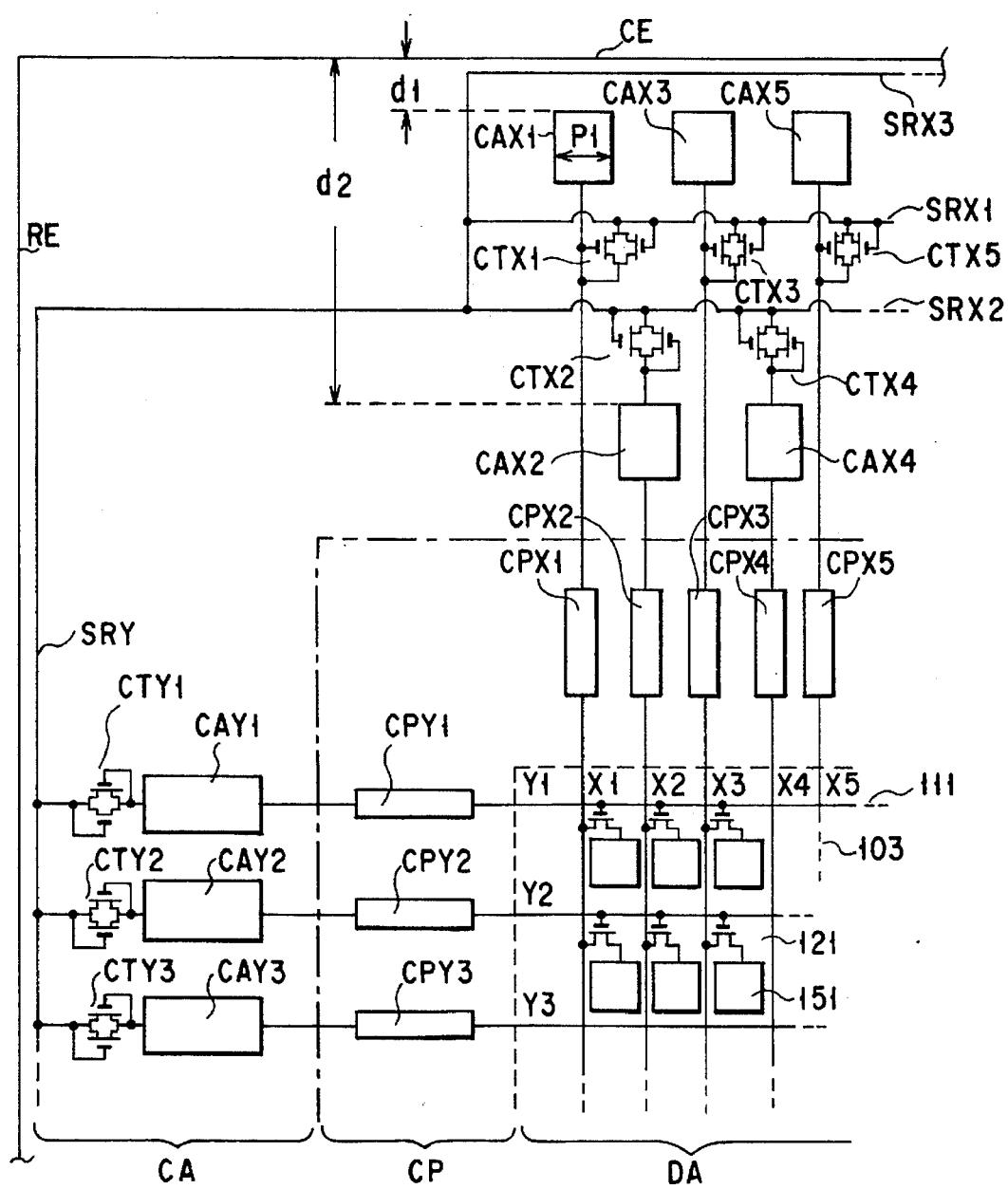
F I G. 2

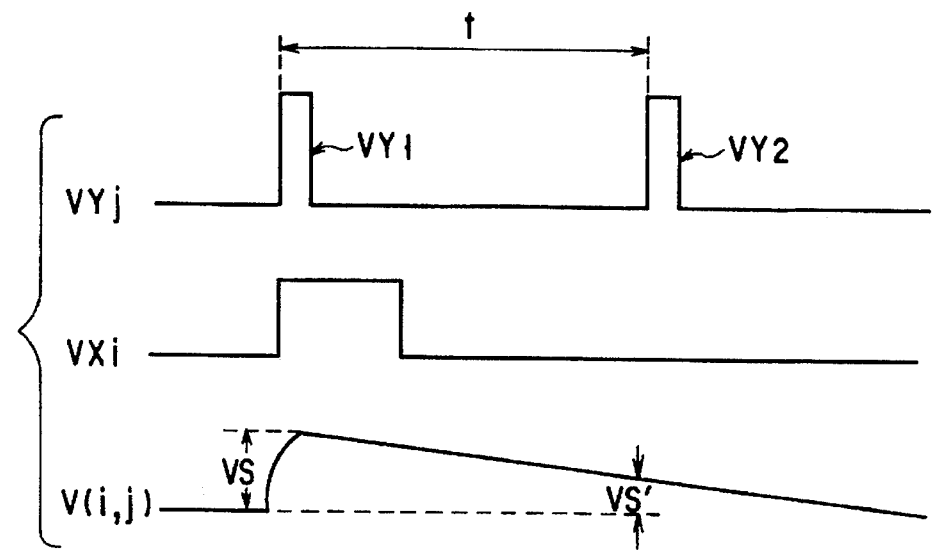
F I G. 5
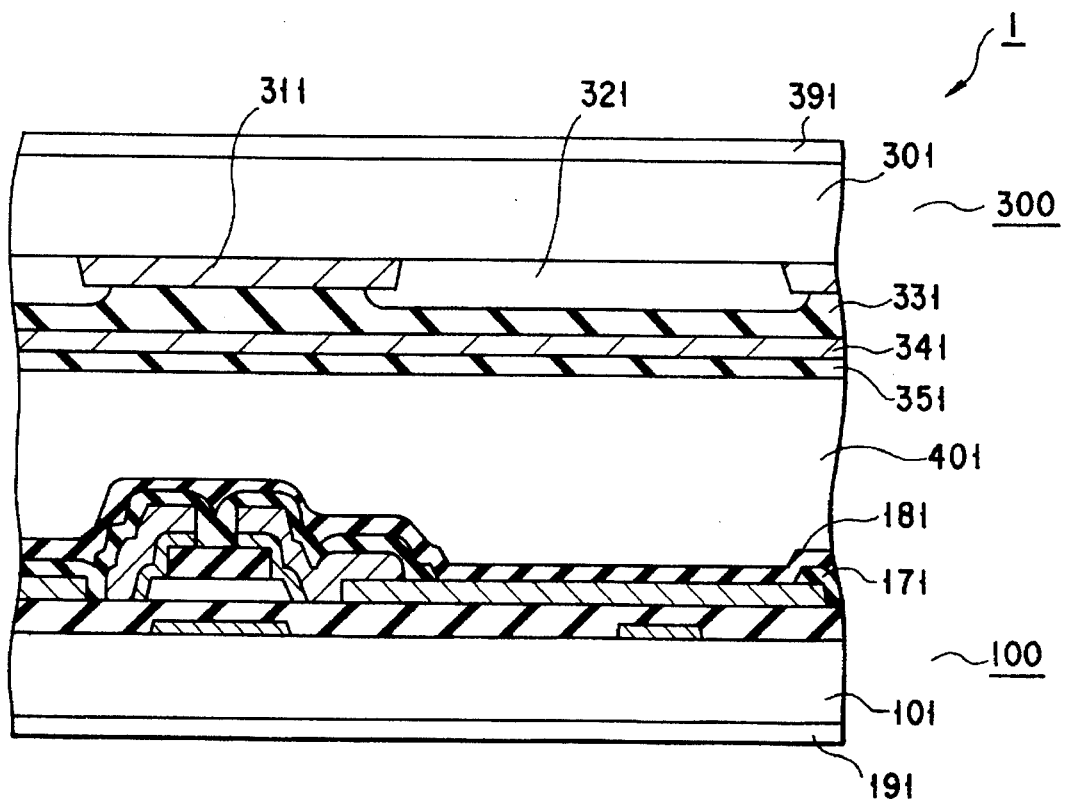
F I G. 6

ARRAY SUBSTRATE FOR A FLAT-DISPLAY DEVICE INCLUDING SURGE PROTECTION CIRCUITS AND SHORT CIRCUIT LINE OR LINES

BACKGROUND OF THE INVENTION

1. Field of the Invention

The present invention relates to an array substrate for a flat-panel display device in which surge-protection switch circuits are connected to the display section.

2. Description of the Related Art

Recently, various apparatuses such as a personal computer, a word processor, a television, a video projector, and the like employ a flat-panel display device represented by a Liquid Crystal Display (LCD), because of its characteristics such as thin, light and low power consumption. Particularly, active matrix LCDs are intensively researched and developed. Since the active matrix LCD has Thin Film Transistors (TFTs) to drive the pixel electrodes, respectively, an excellent display image can be obtained which has no closstalk between adjacent pixels.

The structure of a typical active matrix LCD will be briefly described below. This LCD has a liquid crystal composition held between an array substrate and a counter substrate via orientation films, and displays an image by means of a light transmitted through the liquid crystal composition. The array substrate includes a plurality of pixel electrodes made of Indium Tin Oxide (ITO) and arrayed in a matrix form on a glass substrate, a plurality of scan lines formed along the rows of the pixel electrodes, a plurality of signal lines formed along the columns of the pixel electrodes, and a plurality of pixel TFTs formed near intersections of the scan lines and the signal lines. Each of the pixel TFTs is responsive to a selection signal from the scan line and supplies a pixel signal voltage from the signal line to a corresponding pixel electrode. The array substrate further includes a plurality of storage capacitance lines each of which is formed substantially in parallel with the scan lines and insulated from corresponding pixel electrodes by means of an insulating film so as to constitute a storage capacitance Cs between the storage capacitance line and the corresponding pixel electrode. The counter substrate has a matrix light-shutting film formed on the glass substrate and a common electrode formed on an insulating film covering the light-Shutting film. The light-shutting film shuts off a light transmitted through an area which is located between the pixel electrodes and the scan and signal lines, and shuts off an incident light to the pixel TFTs on the array substrate. The common electrode is electrically connected to a common-potential line provided on the array substrate by a transfer member, which is formed by dispersing electroconductive grains of silver or the like in a resin. The common-potential line, the signal lines, and the scan lines are electrically connected to a driver circuit formed on an external circuit substrate by a Flexible Print Circuit (FPC) wiring plate which has a metal wirings on a flexible base film of polyimide, or by a Tape Automated Bonding (TAB) wiring plate which has driving elements additionally formed on the FPC wiring plate. The array substrate further includes a plurality of connection pads serving as conductive terminals for receiving voltages supplied from the driver circuit to the signal lines and the scan lines, and a plurality of test pads serving as conductive terminals for receiving test voltages supplied for inspecting defects of the pixel TFTs and the wirings thereof. Since the test pads are not used except for the time of inspection, these test pads are located outside the connection pads on the array substrate, so that they can be removed after inspection has been carried out during the manufacture of the array substrate.

For example, Jpn. Pat. Appln. KOKAI Publication No. 3-296725 discloses a technique of protecting the pixel TFTs from electrostatic charge produced during the manufacture of the array substrate. According to the technique, a plurality of surge-protection switch circuits are connected between a short-circuit line formed along the periphery of the array substrate and the scanning and signal lines. Each of the surge-protection switch circuits is formed of diodes, TFTs, or the like of non-linear elements, and serves as a high resistance when a difference between the potentials of the signal or scan line and the short-circuit line is relatively small and as a conductor when the difference is significantly large. Therefore, if the signal or scan line has increased to a high potential due to electrostatic charge produced during the manufacture of the array substrate, the surge-protection switch circuit discharges the electrostatic charge from the signal or scan line to the short-circuit line. If a difference between the potentials of the gate and source of a pixel TFT has extremely increased, the short-circuit line is electrically connected to both the scanning and signal lines connected to the gate and source of the pixel TFT, thereby decreasing the difference. Accordingly, the pixel TFT is prevented from being destroyed due to an increase in the difference between the potentials of the gate and drain of the pixel TFT. At the time of inspecting defects of the pixel TFTs and their wirings, the short-circuit line is electrically disconnected from the scanning and signal lines to which test voltages are supplied. Therefore, defect inspection is not adversely affected by the surge-protection switch circuits.

Conventionally, there is a case where a plurality of surge-protection switch circuits are electrostatically destroyed during the manufacture of the array substrate, thereby short-circuiting adjacent wiring lines (signal lines or scan lines) via the short-circuit line. However, it is difficult to distinguish this short-circuit from the short-circuit caused when the wiring lines are provided in contact with each other.

SUMMARY OF THE INVENTION

An object of the present invention is to provide an array substrate for a flat-panel display device in which surge-protection switch circuits adjacent to each other are not electrostatically destroyed at the same time.

The above object can be attained by an array substrate for a flat-panel display device, which comprises an insulation substrate, a display section formed on the insulation substrate and having a plurality of pixel electrodes arrayed in row and column directions, a plurality of pixel-selection switch elements connected to the pixel electrodes for controlling the potentials thereof, and a plurality of wiring lines connected to the pixel-selection switch elements and extending to a removable area outside the display section, a short-circuit line formed in the removable area, a plurality of surge-protection switch circuits formed in the removable area and connected between the short-circuit line and the wiring lines, each for electrically connecting a corresponding one of the wiring lines to the short-circuit line when the potential of the corresponding wiring line exceeds a predetermined level, and a plurality of test pads formed in the removable area and connected to the wiring lines, wherein the test pads and the surge-protection switch circuits are located on one side of the display section in at least one of the row and column directions, and adjacent ones of the test pads are set apart from a periphery of the insulation substrate by different distances.

The inventors have confirmed from experiments the reason why the aforementioned surge-protection switch circuits are destroyed during the manufacture of the array substrate. The insulation substrate is repetitively placed on and taken up from a supporting base for various processes, and electrostatically charged due to the repetition of placing and taking up. If the insulation substrate having a large amount of charge is brought into contact with an external member such as the supporting base, a positioning pin, or the like, a discharge occurs between the external member and the test pads formed in the removable area of the insulation substrate. This discharge tends to simultaneously destroy the surge-protection switch circuits, which are closer than to the test pads than the display section is.

According to the aforementioned array substrate for a flat-panel display device, adjacent ones of the test pads are set apart from a periphery of the insulation substrate by different distances. In this case, at least one of the surge-protection switch circuits corresponding to the adjacent test pads can be prevented from being electrostatically destroyed. Therefore, at the time of defect inspection, a short-circuit between adjacent wiring lines can be regarded as a specified state where these wiring lines are provided in contact with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a plan view of an array substrate for a flat-panel display device, according to an embodiment of the present invention;

FIG. 2 is a plan view schematically showing the structure of a circuit formed in an area S of the array substrate shown in FIG. 1;

FIG. 5 is a chart showing waveforms of voltages supplied during defect inspection of the array substrate shown in FIG. 1;

FIG. 6 is a cross-sectional view schematically showing the structure of a liquid crystal display device formed using the array substrate shown in FIG. 1.

DETAILED DESCRIPTION OF THE PREFERRED EMBODIMENT

A display apparatus array substrate according to an embodiment of the present invention will now be described in detail with reference to accompanying drawings.

FIG. 1 is a plan view of the array substrate 100. The array substrate is used as an assembly incorporated in a transmission type active matrix Liquid Crystal Display (LCD), for example. In a case where the active matrix LCD has a screen size of 10.4 inches across corners, the array substrate 100 is formed using a transparent glass substrate 101 having a size of 200 mm×300 mm. As shown in FIG. 1, the glass substrate 101 is partitioned into a display area DA, a connection pad area CP, and defect inspection area CA. The connection pad area CP is located outside the display area DA, and the defect inspection area CA is located outside the connection pad area CP.

FIG. 2 shows the structure of a circuit formed in an area S shown in FIG. 1. In the display area DA, the array substrate 100 includes 480×1920 pixel electrodes 151 arrayed in a matrix form, 1920 signal lines 103 (Xi (i=1, 2, 3, . . . , 1920)), and 480 scan lines 111 (Yj (j=1, 2, 3, . . . , 480)). The scan lines 111 are formed along the rows of pixel electrodes 151, and the signal lines 103 are formed along the columns of pixel electrodes 151. Thus, the scan lines 111 are substantially perpendicular to the signal lines 103. The distance between the signal lines 103 are set to 110 µm, and the distance between the scan lines 111 are set to 330 µm. The array substrate 100 further includes 480×1920 pixel Thin Film Transistors (TFTs) 121 which are formed near the intersections of the signal lines 103 and the scan lines 111 and control the potentials of the pixel electrodes 151, respectively.

Figure 3:
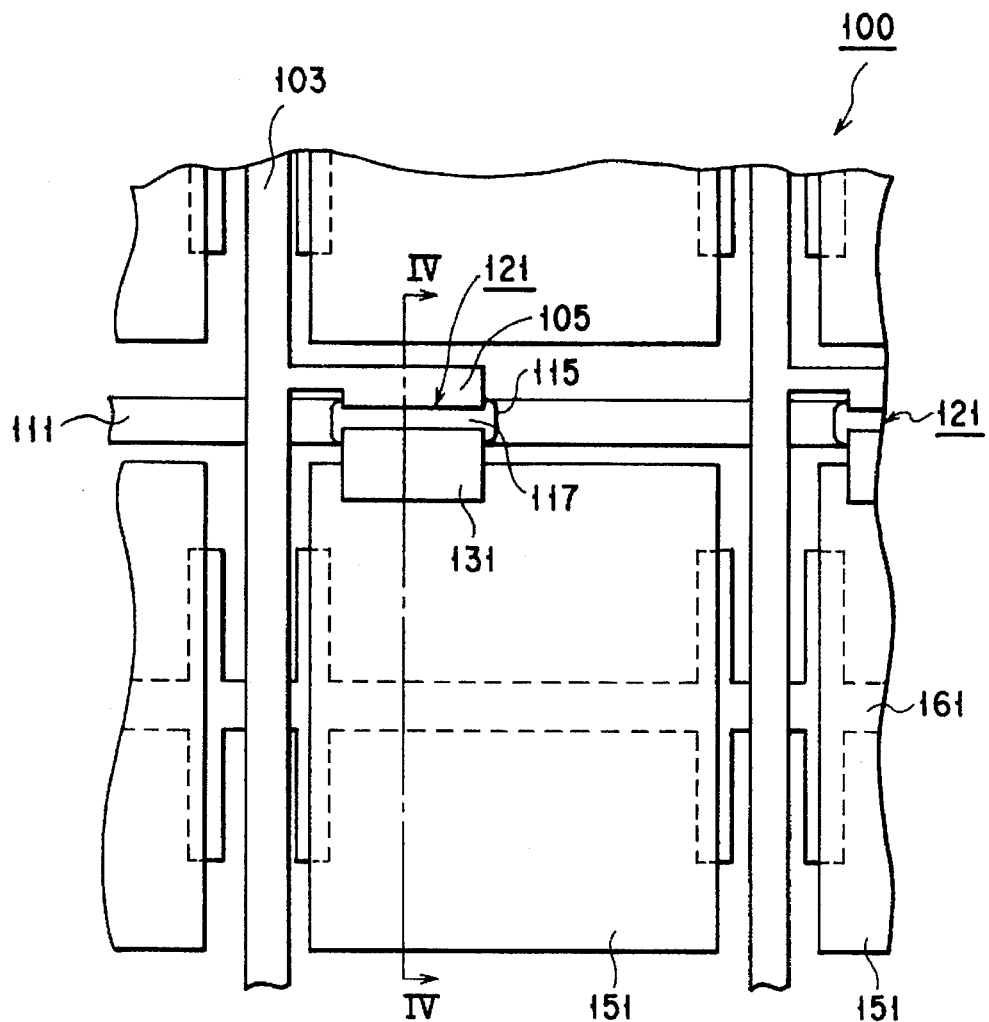
FIG. 3 is a plan view showing the structure of each pixel element formed in a display area DA of the array substrate shown in FIG. 1.
Figure 4:
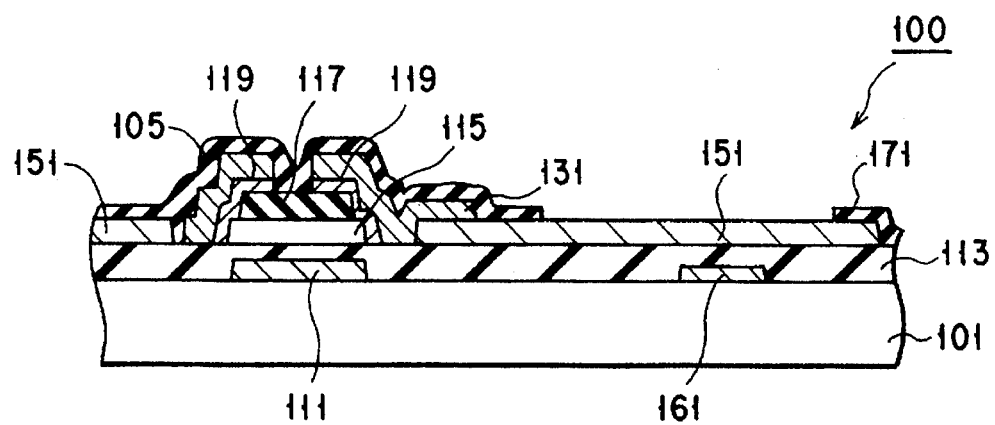
FIG. 4 is a cross-sectional view of the array substrate taken along the line IV—IV in FIG. 3.

In more detail, as shown in FIGS. 3 and 4, each TFT 121 has a gate electrode formed of a part of the scan line 111 on the glass substrate 101, an insulating film 113 formed by depositing silicon oxide and silicon nitride on the gate electrode, and a semiconductor film 115 of a-Si:H formed on the gate electrode via the insulating film 113. On the semiconductor film 115, a channel protection film 117 of silicon nitride is formed in self-alignment with the gate electrode. The semiconductor film 115 is electrically connected to source and drain electrodes 131 and 105 via low resistance semiconductor films 119 made of an n$^+$ type a-Si:H. The source electrode 131 is connected to the pixel electrode 151, and the drain electrode 105 is formed of an extended portion of the signal line 103. The array substrate 100 further includes storage capacitance lines 161 substantially parallel to the scan lines 111. The storage capacitance line 161 and the pixel electrode 151 have overlapped portions which constitute a storage capacitance Cs. The signal lines 103, the scan lines 111, and the pixel TFTs 121 are entirely covered with a protection film 171 of silicon nitride.

In the connection pad area CP, the array substrate 100 includes 480 scan line connection pads CPYj (j=1, 2, 3, . . . , 480) and 1920 signal line connection pads CPXi (i=1, 2, 3, . . . , 1920). As shown in FIG. 2, the scan line connection pads CPYj are respectively connected to portions of the scan lines Yj which extend from the display area DA toward an edge RE of the glass substrate 101. The signal line connection pads CPXi are respectively connected to portions of the signal lines Xi which extend from the display area DA toward an edge CE of the glass substrate 101. The scan line connection pads CPYj and the signal line connection pads CPXi are used as conductive terminals to be connected to a driver circuit provided on an external circuit substrate (not shown). All the scan line connection pads CPYj are arranged only on the same side of the scan lines Yj corresponding to the edge RE of the glass substrate 101, and all the signal line connection pads CPXi are arranged only on the same side of the signal lines Xi corresponding to the edge CE of the glass substrate 101. The above arrangement of the connection pads CPYj and CPXi is selected for effectively increasing the rate of the display area DA to the connection pad area CP along with the usage efficiency of the glass substrate 101.

In the defect inspection area CA, the array substrate 100 includes scan line test pads CAYj (j=1, 2, 3, . . . , 480) and signal line test pads CAXi (i=1, 2, 3, . . . , 1920). The scan line test pads CAYj (j=1, 2, 3, . . . , 480) are respectively connected to portions of the scan lines Yj (j=1, 2, 3, . . . , 480) which extend via the scan line connection pads CPYj (j=1, 2, 3, . . . , 480) toward the edge RE of the glass substrate 101. The signal line test pads CAXi (i=1, 2, 3, . . . , 1920) are respectively connected to portions of the signal lines Xi (i=1, 2, 3, . . . , 1920) which extend via the signal line connection pads CPXi (i=1, 2, 3, . . . , 1920) toward the edge CE of the glass substrate 101. As in the same manner as the scan line connection pads CPYj and the signal line connection pads CPXi, all the scan line test pads CAYj are arranged only on the same side of the scan lines Yj corresponding to the edge RE of the glass substrate 101, and all the signal line test pads CAXi are arranged only on the same side of the signal lines Xi corresponding to the edge CE of the glass substrate 101. The above arrangement of the test pads CAYj and CAXi is selected for effectively increasing the usage efficiency of the glass substrate 101.

The signal line test pads CAXi (i=1, 2, 3, . . . , 1920) are arranged in a staggered form where the odd-numbered test pads CAXi (i=1, 3, 5, . . . , 1919) are disposed away from the edge CE of the glass substrate 101 by a distance d1 and the even-numbered test pads CAXi (i=2, 4, 6, . . . , 1920) are disposed away from the edge CE of the glass substrate 101 by a distance d2. More specifically, the distance d1 is set to 1 mm, whereas the distance d2 is set to 3 mm. Therefore, the even-numbered test pads CAXi (i=2, 4, 6, . . . , 1920) are remote from the edge CE of the glass substrate 101 as compared with the odd-numbered test pads CAXi (i=1, 3, 5, . . . , 1919). In addition, each of the signal line test pads CAXi has a width of 95 μm in a row direction perpendicular to the signal lines Xi, and each of the scan line test pads CAYj has a width of 110 μm in a column direction perpendicular to the scan lines Yj.

The scan line test pads CAYj (j=1, 2, 3, . . . , 480) are connected to a short-circuit line SRY via surge-protection switch circuits CTYj (j=1, 2, 3, . . . , 480). The short-circuit line SRY is formed along and in parallel with the edge RE of the glass substrate 101. The short-circuit line SRY is made of the same material as that of at least the signal lines Xi (i=1, 2, 3, shown in FIG. 4 so as to easily induce a discharge with the outside. Each of the surge-protection switch circuits CTYj are formed by the same step as the pixel TFTs 121, and includes a pair of TFTs whose gate and drain are connected to each other as shown in FIG. 2. The paired TFTs have a resistance of 120 kΩ when a voltage of 20 V is supplied as the source-to-drain voltage thereof.

The odd-numbered signal line test pads CAXi (i=1, 3, 5, . . . , 1919) are connected to a short-circuit line SRX1 via surge-protection switch circuits CTXi (i=1, 3, 5, . . . , 1919). The even-numbered signal line test pads CAXi (i=2, 4, 6, . . . , 1920) are connected to a short-circuit line SRX2 via surge-protection switch circuits CTXi (i=2, 4, 6, . . . , 1920). The short-circuit lines SRX1 and SRX2 are formed in parallel with the edge CE of the glass substrate 101 between the odd-numbered signal line test pads CAXi (i=1, 3, 5, . . . , 1919) and the even-numbered signal line test pads CAXi (i=2, 4, 6, . . . , 1920). The short-circuit lines SRX1 and SRX2 are made of the same material as that of at least the signal lines Xi (i=1, 2, 3, . . . , 1920), and exposed from the protection film 171 shown in FIG. 4 so as to easily induce a discharge with the outside. The short-circuit line SRX1 is closer to the odd-numbered signal line test pads CAXi (i=1, 3, 5, . . . , 1919) than the short-circuit line SRX2 is. The short-circuit line SRX2 is closer to the even-numbered signal line test pads CAXi (i=2, 4, 6, . . . , 1920) than the short-circuit line SRX1 is. The short-circuit line SRY is connected to the short-circuit line SRX2, and the short-circuit line SRX2 is connected to the short-circuit line SRX1. Each of the surge-protection switch circuits CTXi are formed by the same step as the pixel TFTs 121, and includes a pair of TFTs whose gate and drain are connected to each other as shown in FIG. 2. The paired TFTs have a resistance of 120 kΩ when a voltage of 20 V is supplied as the source-to-drain voltage thereof.

The short-circuit lines SRX1 and SRX2 are also connected to an additional short-circuit line SRX3. The short-circuit line SRX3 is made of the same material as that of at least the signal lines Xi (i=1, 2, 3, . . . , 1920), and formed in parallel with the short-circuit lines SRX1 and SRX2 between the edge CE of the glass substrate 101 and the odd-numbered signal line test pads CAXi (i=1, 3, 5, . . . , 1919).

According to the embodiment described above, even if the array substrate 100 is electrostatically charged during the manufacture thereof, the discharge mostly occurs via the short-circuit line SRY close to the edge RE of the glass substrate 101 or the short-circuit line SRX3 close to the edge CE of of the glass substrate 101, thus reducing the damage to the surge-protection switch circuits CTXi and CTYj.

Further, the odd-numbered test pads CAXi (i=1, 3, 5, . . . , 1919) and the even-numbered test pads CAXi (i=2, 4, 6, . . . , 1920) are disposed away from the edge CE of the glass substrate 101 by the different distances d1 and d2, respectively. Therefore, a strong discharge may occur through adjacent ones of the odd-numbered signal line test pads CAXi (i=1, 3, 5, . . . , 1919) or adjacent ones of the even-numbered signal line test pads CAXi (i=2, 4, 6, . . . , 1920). However, this discharge would not occur through a pair of an odd-numbered signal line test pad CAXi (i=p) and an even-numbered signal line CAXi (i=p+1) corresponding to signal lines Xi (i=p) and Xi (i=p+1) adjacent to each other.

Moreover, since the short-circuit lines SRX1 and SRX2 are arranged between the odd-numbered test pads CAXi (i=1, 3, 5, . . . , 1919) and the even-numbered test pads CAXi (i=2, 4, 6, . . . , 1920), they serve as electrical shields for the even-numbered signal line test pads CAXi (i=2, 4, 6, . . . , 1920). The electrical shields can protect the surge-protection switch circuits CTXi (i=2, 4, 6, . . . , 1920) connected to the even-numbered signal line test pads CAXi (i=2, 4, 6, . . . , 1920) from a discharging of electrostatic charge which destroys the surge-protection switch circuits CTXi (i=1, 3, 5, . . . , 1919) connected to the odd-numbered signal line test pads CAXi (i=1, 3, 5, . . . , 1919).

The surge-protection switch circuits CTXi (i=1, 3, 5, . . . , 1919) are connected between the short-circuit line SRX1 and the odd-numbered signal line test pads CAXi (i=1, 3, 5, . . . , 1919), the surge-protection switch circuits CTXi (i=2, 4, 6, . . . , 1920) are connected between the short-circuit line SRX2 and the even-numbered signal line test pads CAXi (i=2, 4, 6, . . . , 1920), and the short-circuit lines SRX1 and SRX2 are connected to each other at a position outside a frame surrounding the signal line test pads CAXi (i=1, 2, 3, . . . , 1920). With this construction, the simultaneous electrostatic destruction of adjacent ones of the surge-protection switch circuits CTXi can be more effectively prevented.

The test pads CAYj and the connection pads CPYj are arranged on the same side of the scan lines Yj corresponding to the edge RE of the glass substrate 101, and the test pads CAXi and the connection pads CPXi are arranged on the same side of the signal lines Xi corresponding to the edge CE of the glass substrate 101. Therefore, the usage efficiency of the glass substrate 101 can be improved as compared with the case where the circuit components are formed also on the other side of the scan lines Yj and the other side of the signal lines Xi. Further, this arrangement can reduce the rate of the connection pad area CP to the display area DA.

Despite that the signal line test pads CAXi (i=1, 2, 3, ..., 1920) are arranged on one side of the signal lines Xi corresponding to the edge CE of the glass substrate 101, the width P1 of each signal line test pad CAXi can be widened based on twice the distance between the signal lines Xi, since the signal line test pads CAXi (i=1, 2, 3, ..., 1920) are arranged in a staggered form. Therefore, it is possible to reliably prevent a contact error which may occur when test probes are brought into contact with the signal line test pads CAXi (i=1, 2, 3, ..., 1920).

Defect inspection of the array substrate 100 will be described. At the time of the defect inspection, test probes are brought into contact with the test pads CAYj and CAXi and the short-circuit lines SRX1, SRX2, SRX3, and SRY so as to variably set the potentials thereof.

Short-circuits between adjacent ones of the wiring lines are found in the following manner. With regard to a short-circuit between the adjacent signal lines X1 and X2, the current between the test pads CAX1 and CAX2 is measured in a condition where the potentials of the short-circuit lines SRX1, SRX2, SRX3, and SRY are set to 0 V, and the potentials of the test pads CAX1 and CAX2 are respectively set to 5 V and 0 V. If a measured value of the current is almost zero, it is determined that the signal line X1 is provided not in contact with the signal line X2, and the surge-protection switch circuit CTX1 is in a normal state serving as a high resistance. On the other hand, if a measured value of the current is significantly greater than zero, it is determined that the signal line X1 is provided in contact with the signal line X2 or the surge-protection switch circuit CTX1 is in an electrostatically destroyed state serving as a conductor. (Instead of the current, the voltage across a capacitor charged by the current may be measured.)

A contact between signal lines X1 and X2 can be detected from the current between the test pads CAX1 and CAX2 since this current decreases when the potential of the test pad CAX2 is changed from 0 V to 5 V, which is equal to the potential of the test pad CAX1. Further, electrostatic destruction of the surge-protection switch circuit CTX1 can be detected from the current between the test pad CAX1 and the short-circuit line SRX1, since this current decreases when the potentials of the short-circuit lines SRX1, SRX2, SRX3, and SRY are changed from 0 V to 5 V, which is equal to the potential of the test pad CAX1.

In addition, the defect inspection area CA having the surge-protection switch circuits CTX1 and CTX2 formed therein is removed at the time of assembling a liquid crystal display device using the array substrate 100. Accordingly, the production value of the array substrate 100 is not damaged even if both the surge-protection switch circuits CTX1 and CTX2 are electrostatically destroyed. In the case where the signal lines X1 and X2 are provided in contact with each other, the array substrate 100 is treated as a defective product since the signal lines X1 and X2 must remain on the array substrate 100.

The above inspection method cannot be used if it is necessary to distinguish electrostatic destruction of the surge-protection switch circuits CTX1 and CTX2 from a contact between the signal lines X1 and X2. However, the array substrate 100 of the embodiment is constructed to prevent simultaneous electrostatic destruction of the surge-protection switch circuits CTX1 and CTX2. Therefore, this inspection method can be used to determine whether the array substrate 100 is a defective product in which the signal lines X1 and X2 are provided in contact with each other.

Disconnections in the wiring lines, defects in the pixel TFTs, and other defects are found in the following manner. In FIG. 5, VXi denotes the potential of each of the signal line test pads CAXi, VYj denotes the potential of each of the scan line test pads CAYj, and V(i, j) denotes mainly the voltage across each of the storage capacitances Cs. A first selection pulse voltage VY1 of 20 V is sequentially supplied to the scan line test pads CAYj to select every row of the TFTs, while continuously supplying a voltage VX of 5 V to the signal line test pads CAXi. Thus, a predetermined voltage Vs is stored in each of the storage capacitance Cs as a difference between the potentials of the pixel electrode 151 and the storage capacitance line 161. The voltage Vs gradually decreases along with time due to leakage. Under these circumstances, after an elapse of a predetermined time t, a second selection pulse voltage VY2 is sequentially supplied to the scan line test pads CAYj again, and the voltage stored in each storage capacitance Cs is read from a corresponding one of the signal line test pads CAXi.

In the normal array substrate 100, the storage capacitance Cs stores a voltage Vs' decreased from the voltage Vs by a predetermined amount at the time of reading. However, in the case where there is a defect in the array substrate 100, the following voltage Vs' is read.

For example, in the case where a scan line Y1 is disconnected between a signal line X4 and a signal line X5, the voltage VX is not applied to any of pixel electrodes 151 corresponding to the combinations of the scan line Y1 and signal lines X5 to X1920. Therefore, the voltage Vs' different from that of the normal array substrate 100 is read out from each of the storage capacitances Cs between the storage capacitor line 161 and the pixel electrodes 151 corresponding to the combinations of the scan line Y1 and the signal lines X5 to X1920. Consequently, it can be detected that the scan line Y1 is disconnected between the signal line X4 and the signal line X5.

Also in the case where a signal line X1 is disconnected between scan lines Y2 and Y3, the voltage VX is not applied to any of pixel electrodes 151 corresponding to the combinations of the signal line X1 and the scan line Y3 to Y480 as in the above-described case; therefore the disconnection of the signal line X1 can be detected.

In the case where there is a defect in a TFT 121 located at an intersection of a scan line Y2 and a signal line X2, the voltage Vs' different from that of the normal array substrate 100 is read out from the storage capacitance Cs between the storage capacitor line 161 and the pixel electrode 151 corresponding to the TFT 121. Unlike the above-described disconnections, the voltage Vs' reflects the state of the TFT. Therefore, it can be detected that the TFT 121 located at the intersection of the signal line X2 and the scan line Y2 is defective.

In the case where a pixel electrode 151 and storage capacitance line 161 corresponding to the combination of a signal line X1 and a scan line Y1 are short-circuited, this short-circuit can be detected from the potential of the storage capacitance line 161.

After confirming in the above-described defect inspection that the array substrate 100 is normal, a liquid crystal display device is assembled by using the array substrate 100.

In an initial step, an orientation film 181 shown in FIG. 6 is provided by relief-printing an organic film on the entire display area DA shown in FIG. 2, drying the organic film, and then subjecting the organic film to a rubbing treatment. Thereafter, the array substrate 100 and a counter substrate 300 are adhered together with a gap of 5 microns. The gap is filled with a liquid crystal material 401 injected therein through an opening left between the substrate 100 and 300, and then the opening is sealed. The counter substrate 300 includes a matrix light-shutting film formed on a transparent glass substrate 301, a common electrode 341 covering the light-shutting film 311 via an organic protection film 331, and an orientation film 351 formed on the common electrode 341. The light-shutting film 311 is constituted by a chromium oxide layer and a chromium layer formed thereon, and shuts off a light transmitted through an area which is located between the pixel electrodes and the scan and signal lines, and an incident light to the pixel TFT on the array substrate 100. A color filter 321 is formed for the pixel electrodes 151, which are not masked by the light-shutting film 311, and transmits a light in which three color components of red R, green G, and blue B are selectively assigned to the pixel electrodes 151.

After the array substrate 100 and the counter substrate 300 are adhered together, the defect inspection area CA shown in FIG. 2 is removed from the array substrate 100 by mechanical cutting, energy-beam cutting, or beveling, and then polarizing plates 191 and 391 shown in FIG. 6 are adhered to the substrates 100 and 300, thereby forming a liquid crystal display panel 1. The connection pads CPXi and CPYj left on the liquid crystal display panel 1 are electrically connected to a driver circuit (not shown) provided on an external circuit substrate. Then, the display panel 1 is fixed to a case along with an area illumination light source. At this time, the display area DA of the display panel 1 is exposed from the case, and the illumination light source is positioned at the back of the display panel 1. After fixing the display panel 1, the liquid crystal display device is completed.

According to the embodiment, even if the array substrate 100 is electrostatically charged in the middle of the manufacture thereof, the surge-protection switch circuits CTXi and CTYj can effectively protect the pixel TFTs 121 formed in the display area from electrostatic destruction. Further, since adjacent ones of the signal line test pads CAXi are disposed away from the edge CE by different distances, adjacent ones of the surge-protection switch circuits CTXi can be prevented from being electrostatically destroyed at the same time. Therefore, electrostatic destruction of these surge-protection switch circuits CTXi needs not be regarded as a factor of short-circuiting adjacent two signal lines Xi, thus shortening a time required for the defect inspection and improving the yield in the manufacture.

Further, the odd-numbered signal line test pads CAXi (i=1, 3, 5, ..., 1919) are set apart from the even-numbered signal line test pads CAXi (i=2, 4, 6, ..., 1920) by the short-circuit lines SRX1 and SRX2. Therefore, the width P1 of each signal line test pad CAXi can be set relatively large even if the interval between the signal lines Xi is very small, and therefore the electrical connection between the test probe and the signal line test pad CAXi can be assured. Thus, the inspection can be accurately performed without causing a position error or the like.

The present invention is not limited to the embodiment described above, and various modifications may be made without departing from the spirit or scope of the invention.

For example, the scan line test pads CAYj can be arranged in a staggered form, as well as the signal line test pads CAXi described above. When adjacent ones of the scan line test pads CAYj are disposed away from the edge RE by different distances as shown in FIG. 7, adjacent two surge-protection switch circuits CTYj also can be prevented from being electrostatically destroyed at the same time.

Figure 7:
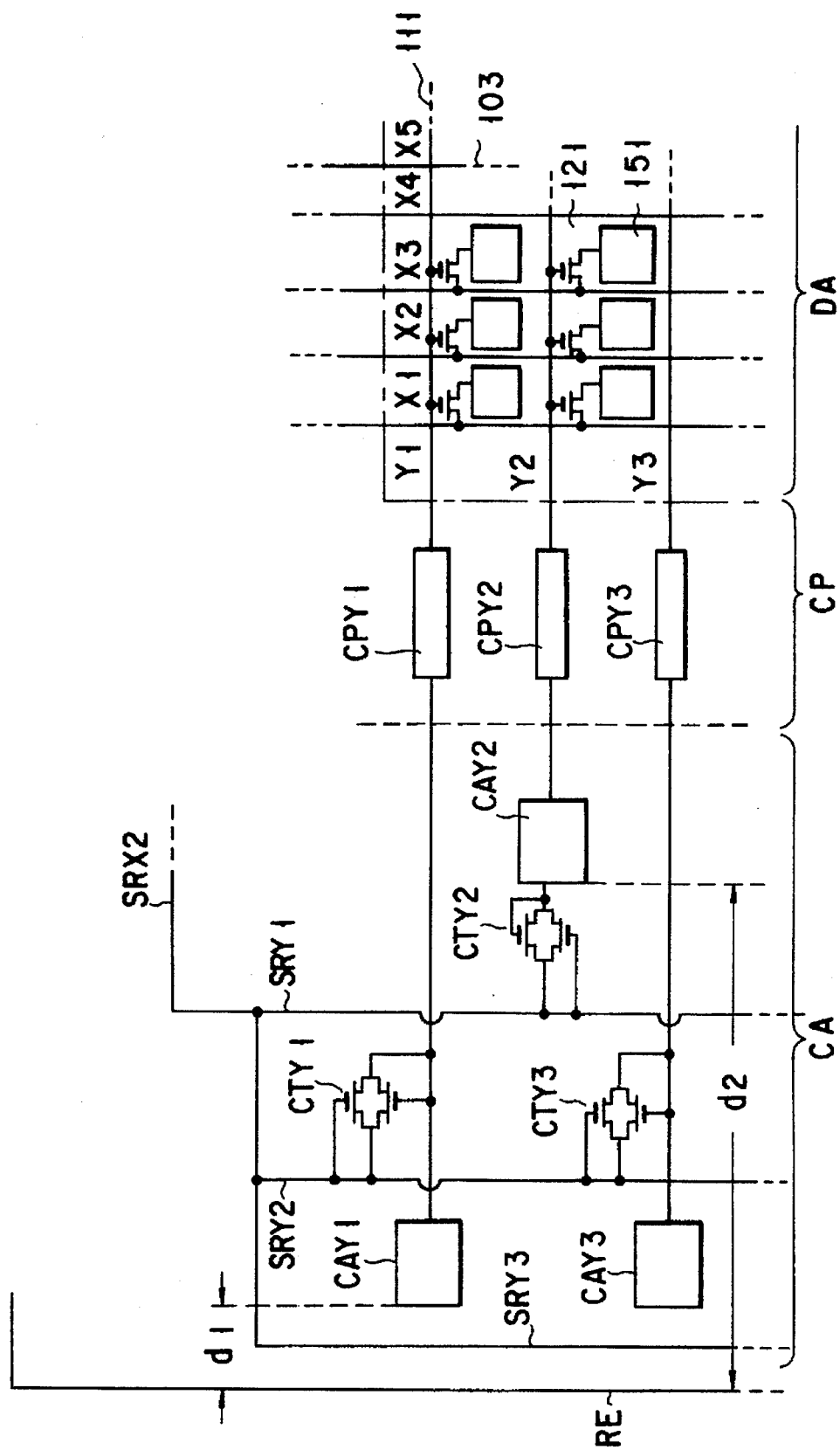
FIG. 7 is a view showing a modification to the circuit shown in FIG. 2.

In FIG. 7, the odd-numbered scan line test pads CAYj (j=1, 3, 5, ..., 480) are electrically connected to a short-circuit line SRY2 via the surge-protection switch circuits CTYj (j=1, 3, 5, ... 479), and the even-numbered scan line test pads CAYj (j=2, 4, 6, ..., 480) are electrically connected to a short-circuit line SRY1 via the surge-protection switch circuits CTYj (j=2, 4, 6, ..., 480). However, all the scan line test pads CAYj (j=1, 2, 3, ..., 480) can commonly be connected to the short-circuit line SRY via the surge-protection switch circuits CTYj (j=1, 2, 3, ..., 480) in the same manner as the aforementioned embodiment.

In the above-described embodiment, the array substrate 100 is constructed such that the short-circuit line SRX1 is electrically connected to the odd-numbered signal lines Xi (i=1, 3, 5, ..., 1919) via the surge-protection switch circuits CTXi (i=1, 3, 5, ..., 1919), and the short-circuit line SRX2 is electrically connected to the even-numbered signal lines Xi (i=2, 4, 6, ..., 1920) via the surge-protection switch circuits CTXi (i=2, 4, 6, ..., 1920). However, three or more short-circuit lines can be used. When the number of short-circuit lines is set to three, a first, a second and a third short-circuit lines are electrically connected to the signal lines Xi (i=1, 4, 7, ..., 1918), the signal lines Xi (i=2, 5, 8, ..., 1919), and the signal lines Xi (i=3, 6, 9, ..., 1920) via the surge-protection switch circuits CTXi (i=1, 4, 7, ..., 1918), the surge-protection switch circuits CTXi (i=2, 5, 8, ..., 1919), and the surge-protection switch circuits CTXi (i=3, 6, 9, ..., 1920), respectively.

In the above-described embodiment, each of the surge-protection switch circuits CTXi and CTYj is constituted by a pair of TFTs. However, the pair of TFTs can be replaced by more than two TFTs or diodes in order to obtain a desired resistance.

Further, in the above-described embodiment, the defect inspection of the array substrate 100 is carried out during the manufacture thereof. However, a similar defect inspection can be performed once again before removing the defect inspection area CA, in order to avoid the mixing of a no good product in a subsequent step. Also, the defect inspection area CA may be removed from the completed array substrate 100 before assembling a liquid crystal display device using the substrate 100.

In the above-described embodiment, it is also possible that an additional short-circuit line is formed in the connection pad area CP along with a plurality of additional surge-protection switch circuits for electrically connecting the signal lines Xi and the scan lines Yj to the additional short-circuit line. With such a structure, the pixel TFTs 121 can be protected from electrostatic destruction after the removal of the defect inspection area CA, even if the array substrate 100 is electrostatically charged, for example, in the step of adhering polarizing plates thereto.

What is claimed is:

1. An array substrate for a flat-panel display device, comprising:

an insulation substrate;

a display section formed on said insulation substrate and having a plurality of pixel electrodes arrayed in row and column directions, a plurality of pixel-selection switch elements connected to said pixel electrodes for controlling the potentials thereof, and a plurality of wiring lines connected to said pixel-selection switch elements and extending to a removable area outside the display section;

a short-circuit line formed in said removable area;

a plurality of surge-protection switch circuits formed in said removable area and connected between said short-circuit line and said wiring lines, each for electrically connecting a corresponding one of said wiring lines to said short-circuit line when the potential of the corresponding wiring line exceeds a predetermined level; and a plurality of test pads formed in said removable area and connected to said wiring lines;

wherein said test pads and said surge-protection switch circuits are located on one side of the display section in at least one of said row and column directions, and adjacent ones of said test pads are set apart from a periphery of the insulation substrate by different distances.

2. An array substrate according to claim 1, wherein said test pads include a first group of test pads which are set apart from the periphery of said insulation substrate by a first distance and a second group of test pads which are set apart from the periphery of said insulation substrate by a second distance greater than said first distance, and said short-circuit line is located between said first group of test pads and said second group of test pads.

3. An array substrate according to claim 2, wherein said short-circuit line includes first and second lines substantially parallel to each other, said first group of test pads are connected to said first line via corresponding ones of said surge-protection switch circuits, and said second group of test pads are connected to said second line via corresponding ones of said surge-protection switch circuits.

4. An array substrate according to claim 2, further comprising an additional short-circuit line formed between the periphery of said insulation substrate and said first group of test pads and connected to said short-circuit line.

5. An array substrate according to claim 1, further comprising a protection film said short-circuit line having a window which exposes on said insulation substrate.

6. An array substrate according to claim 1, wherein said wiring lines include a plurality of scan lines formed along rows of the pixel electrodes and a plurality of signal lines formed along columns of the pixel electrodes, said test pads include a plurality of scan line test pads connected to said scan lines and a plurality of signal line test pads connected to said signal lines, and each of said pixel-selection switch elements has a thin film transistor having a gate connected to one of the scan lines and a channel connected between one of said signal lines and one of said pixel electrodes.

7. An array substrate according to claim 6, wherein all of said signal line test pads are arranged on one side of said signal lines.

8. An array substrate according to claim 6, wherein all of said scan line test pads are arranged one side of said scan lines.

9. An array substrate according to claim 6, wherein all of said signal line test pads are arranged on one side of said signal lines, and all of said scan line test pads are arranged one side of said scan lines.

10. An array substrate for a flat-panel display device, comprising:

an insulation substrate;

a display section formed on said insulation substrate and having a plurality of pixel electrodes arrayed in row and column directions, a plurality of pixel-selection switch elements connected to said pixel electrodes for controlling the potentials thereof, and a plurality of wiring lines connected to said pixel-selection switch elements and extending to a removable area outside the display section;

a short-circuit line formed in said removable area;

a plurality of surge-protection switch circuits formed in said removable area and connected between said short-circuit line and said wiring lines, each for electrically connecting a corresponding one of said wiring lines to said short-circuit line when the potential of the corresponding wiring line exceeds a predetermined level;

a plurality of test pads formed in said removable area and connected to said wiring lines; and an additional short-circuit line formed between a periphery of the insulation substrate and said test pads and conductively connected to said short-circuit line.

11. An array substrate according to claim 10, wherein said test pads and said surge-protection switch circuits are located on one side of the display section in at least one of said row and column directions.

12. An array substrate for a flat-panel display device, comprising:

an insulation substrate;

a display section formed on said insulation substrate and having a plurality of pixel electrodes arrayed in row and column directions, a plurality of pixel-selection switch elements connected to said pixel electrodes for controlling the potentials thereof, and a plurality of wiring lines connected to said pixel-selection switch elements and extending to a removable area outside the display section;

a plurality of short-circuit lines formed in said removable area;

a plurality of surge-protection switch circuits formed in said removable area and each connected between a corresponding one of said short-circuit lines and a corresponding one of said wiring lines, each for electrically connecting the corresponding wiring line to the corresponding short-circuit line when the potential of the corresponding wiring line exceeds a predetermined level; and a plurality of test pads formed in said removable area and connected to said wiring lines;

wherein adjacent ones of said test pads are connected to different short-circuit lines via corresponding surge-protection switch circuits.

13. An array substrate according to claim 12, wherein said test pads and said surge-protection switch circuits are located on one side of the display section in at least one of said row and column directions.

14. An array substrate according to claim 13, wherein said plurality of short-circuit lines include a first short-circuit line which is connected to odd-numbered ones of said test pads via corresponding surge-protection switch circuits, and a second short-circuit line which is connected to even-numbered ones of said test pads via corresponding surge-protection switch circuits.

* * * * *